Patented Dec. 3, 1946

2,411,905

UNITED STATES PATENT OFFICE 2,411,905

WATER DISPERSED RUBBER ADHESIVE

Henry N. Stephens, White Bear, Minn., assignor to Minnesota Mining & Manufacturing Company, St. Paul, Minn., a corporation of Delaware No Drawing. Application August 11, 1941, Serial No. 406,397. In Canada March 28, 1939

14 Claims. (Cl. 260—755)

This invention relates to improved water-dispersed rubber adhesives or cements, which dry to form smooth tacky tenacious adhesive films.

Generally, the dispersion of rubber in water with the use of emulsifying agents is old. However, the use of ingredients hereinafter specified and the particular manner in which they are incorporated, materially increases the tackiness of dried deposits and decreases the susceptibility toward viscosity changes as compared with the so-called rubber dispersions heretofore manufactured.

In accordance with my present invention soap-type or equivalent water-dispersed rubber adhesives are prepared as follows: A tack-producer, which is preferably compatible with rubber in all proportions, which is preferably non-acidic or which has a relatively low acid value, and which is preferably substantially insoluble in dilute aqueous alkali solutions, such as low acid type ester gum, or a neutral resin such as "Nevillite," is mixed in an internal mixer with rubber, and, if desired, a filler which may comprise in whole or in part a pigment, or the like, together with a suitably small proportion of a higher aliphatic or cycloaliphatic acid serving as a soap-forming acid. The tack-producing agent, which is desirably of a resinous nature, is preferably one which blends with rubber in all proportions and renders it tacky, and is present in a proportion adapted to produce this result, preferably about ⅓ to ⅔ part per part of rubber, yielding a smooth compatible composition. Of the above mentioned tack-producing agents, "Nevillite" is to be preferred for its complete freedom from acids; however, for economic reasons we use in practice ester gums derived from gum rosins or wood rosins, which give sufficiently satisfactory results.

"Nevillite" resin is a hydrogenated polymer or mixture of polymers of very low iodine number derivable from non-nitrogenous polymerizable coal tar unsaturates, said hydrogenated polymers being characterized by a very high compatibility with rubber compared with the cumarone-indene type resins, and by resistance to development of color by atmospheric oxidation.

After a homogenous mixture (including rubber, compatible tack-producing resin and preferably also soap-forming acid) has been obtained, water is worked into the mass, in the disperse phase, in sufficient amount, but not greatly in excess thereof, to permit an inversion of phase upon continued mixing at a suitable temperature merely upon the addition of the necessary amount of alkali, such as potassium hydroxide, to render the dispersion alkaline and form soap. The soap, which acts as the dispersing agent, is thus formed in situ at the point of inversion by addition of said alkali with continued mixing. After inversion, the resulting oil-in-water type dispersion may, of course, be diluted to the desired viscosity by the addition of water.

This procedure is found to be more effective, both in terms of process and the resulting dispersed adhesive, than the use of pre-formed soap or soap formed in situ before the addition of water in substantial amount; in the latter case, with the soap already formed, water was then required to be introduced gradually over a period of hours in commercial operations to effect inversion.

The tack-producer is acted upon only slightly, if at all, by the free alkali, which must be present in substantial excess in the finished stable dispersion, that is, the pH of the final dispersion must be above 7. The lower the acid number of the resin, the less will it be attacked by the alkali.

The objects and advantages of my improved water-dispersed cements are several. First, I obtain a sprayable, relatively quick breaking dispersion which has extensive utility as an adhesive, e. g., in attaching felts, fabrics, and the like, to metal, wood, glass, etc., or to each other, and has many advantages over adhesive cements of the gasoline solvent type, including the avoidance of inflammable and toxic vapors. Second, by the formation of the dispersing agent in situ at the point of inversion, I obtain stable dispersions of unusually low viscosity for a given solids content, and having a low susceptibility to viscosity increase upon standing. Third, I find that the formation of the soap in situ at the point of inversion, particularly where the water present at the point of inversion is limited substantially to that which is sufficient as above indicated, provides important technological advantages and economies, both in terms of process and the resulting composition, the resulting composition having very different and superior characteristics as an adhesive from all dispersions of the oil-in-water type made by prior art methods known to me. Fourth, I desire a product in which the rubber and resin are uniformly blended in the discrete particles of dispersed material in the oil-in-water type dispersion, as contrasted with mere mixtures of emulsions or dispersions of rubber with emulsions or dispersions of asphalt or the like. Fifth, I produce an oil-in-water dispersion, highly useful as an adhesive, by first producing a stiff and plastic, though workable, water-in-oil type dispersion and then inverting the same by the production of a soap or like dispersing agent in situ at the point of inversion after sufficient but substantially only sufficient water has been uniformly incorporated into the rubber material to permit inversion upon formation of the dispersing agent in situ, whereupon an adhesive is attained which is of advantageous and novel properties both in the form of the dispersion and in the form of the dried film produced therefrom.

Sixth, it is an object of this invention to modify and increase the tack of the natural, synthetic or reclaimed rubber with a material which is normally composed in part, or even substantially completely, of relatively non-acidic tack-producing resins or resinous substances, as above illustrated, whereupon I attain a dispersion which dries to form a tacky, pressure-sensitive film in which the soap content is low. Seventh, a further object is to produce a water-dispersed adhesive which shortly after application as a film to a surface of metal, etc., will break over upon evaporation of a part of the water, whereupon a tacky, pressure-sensitive film is then immediately provided, permitting prompt bonding, e. g., of fabric to metal. A further object is to produce an adhesive as just defined which, in the form of the dried film, forms a bond which has good resistance to water. A further object (where a natural crude or a synthetic rubber is used along with ester gum, "Nevillite" resin, etc.) is to produce a water dispersion which, upon application as a film, yields a transparent, tacky pressure-sensitive film, which is heat-resistant and water-resistant. These and other objects and advantages appear from the description as a whole.

While I necessarily illustrate my improved dispersed rubber cement by describing the use of specific ingredients, it will be readily understood that the substitution of an equivalent ingredient in substantially equivalent proportion and using substantially the same or an equivalent method of mixing, will result in a like cement. While I prefer to use potassium hydroxide as an emulsifying or soap-forming agent, a like water-soluble alkali such as sodium hydroxide may be substituted. While I prefer to use an unsaturated aliphatic or alicyclic acid, e. g., oleic acid, to react with the alkali to form the soap emulsifying agent, I may employ other unsaturated higher aliphatic or alicyclic acids, such as linoleic acid or resin acids such as abietic acid, or, less desirably, I may substitute in whole or in part saturated acids such as stearic acid or the naphthenic acids, all such acids, or equivalent materials capable of reacting with a second reactant, e. g. an alkali, being designated in the claims by the term "soap-forming acid."

Without intention to limit this improvement in adhesives, it is to be understood that a filler such as clay, slate flour, and the like, or a pigment such as carbon black, zinc sulfide and the like, or mixtures thereof, may be used with the rubber, which may be either natural or synthetic, or reclaimed rubber, but such fillers may be omitted in various comprehended embodiments of my invention.

To illustrate the embodiments of this invention, the following examples in the form of representative formulae are given in which ingredients are used in approximate percentages by weight as indicated, based on the final composition as a whole:

*Example 1*

| | Per cent |
|---|---|
| Milled reclaimed rubber | 33 |
| Clay (non-colloidal) | 16.5 |
| Ester gum (low acid type) | 11 |
| Oleic acid | 1 |
| Potassium hydroxide | 0.75 |
| Water | 37.75 |

In general, for preparing this composition, mix the milled reclaimed rubber and ester gum with the oleic acid in a suitable mixer, such as a Werner-Pfleiderer mixer, warming the batch to a temperature of approximately 190° to 210° F. by use of steam in the jacket of the mixer; then shut off the steam and work in the filler with cold water circulating in the jacket of the mixer to prevent a further rise in temperature from the internal work. Next is added approximately 15 to 30 percent of the total water, in this specific case about 22 percent thereof, (which may be all or partly in the form of ice to secure more rapid cooling to the temperature of inversion) and mixing is continued until the water has been thoroughly incorporated. It will be seen that the amount of water thus added prior to inversion in Example 1 is approximately 15 percent by weight of the total solids and in order to accomplish the results desired, the water content may not be varied greatly from that ratio with this specific mix. At this point, inversion will take place upon the addition of the required amount of alkali, within a relatively wide temperature range. However, we have secured the most satisfactory dispersions at temperatures approximating 145° F., with slight variations within a range above and below 145° F., dependent on the particular mix and the size of the batch, which may in a commercial operation as here defined weigh about 2500 lbs. More water is then added gradually until the total mixing is complete. In this instance, a water-soluble soap (e. g., potassium oleate, potassium abietate, etc.) is formed in situ at the point of inversion of phase. Inversion of phase results in the composite of rubber and resin, together, perhaps, with some of the filler, going into the disperse phase, the dilute soap solution furnishing the continuous phase. The emulsion thus formed dries to a tacky, pressure-sensitive film upon evaporation of the water, in contrast to films from emulsions containing protective colloids such as colloidal clay.

Rarely ever, even with wide variations in composition of the plastic mixture containing reclaimed rubber will the inversion temperature vary more than about 25° F. from 145° F., and usually in practice most advantageously the temperature of inversion will be within the range of 140° F. to 160° F.; see the copending application of Harvey J. Livermore, Gordon F. Lindner and myself, Serial No. 247,842, pages 7, 8, etc. Somewhat lower and also somewhat higher temperatures can be used in certain cases, but the highest temperature must necessarily be below about 175° F. with all plastic reclaimed rubber compositions known to me and should not be much, if any, above about 190° F., even with wide variations of plastic natural or synthetic rubber containing compositions, though in the latter case minimum inversion temperatures may be and commonly are relatively high, e. g., 160°, 170°, or 180° F., depending among other things on the amount of milling or mechanical work the rubber has received. With varying plastic compositions the optimum temperature range for inversion may be ascertained by trial and, although for each given composition the range may be quite narrow and critical, with different compositions the range may vary considerably, as above indicated.

*Example 2*

| | Per cent |
|---|---|
| Reclaimed rubber | 30.00 |
| Estergum (low acid type) | 19.7 |
| "Dixie" clay | 14.75 |
| Oleic acid | 1.28 |
| Potassium hydroxide | .5 |
| Water | 33.7 |

One part of reclaimed rubber is milled for 20 minutes on a rubber mill and is then placed in an internal mixer where it is further worked on for an additional five minutes. During the time it is in this mixer, it is heated by the internal heat that is developed during the kneading operation plus the additional heat supplied to the mixer by putting steam into the steam jacket provided on such a mixer, and the temperature rises to about 190° to 210° F. (Where, in the case of different batches the stiffness of the mass makes the same desirable, the temperature at this point may be allowed to rise somewhat higher, e. g., to 240° to 250° F., more or less.)

Two-thirds part of ester gum is then added and the mixing is continued, the ester gum being added at as rapid a rate as it can be put in the mixer without causing lumps to form in the composition. The mixing is continued until the combination of ester gum and reclaim is of a smooth texture.

One-half part of Dixie clay is next added and the mixing is continued until this ingredient has been thoroughly incorporated. During all of this mixing operation it is necessary to continue to do work on the stock to get a smooth mixture, and in some cases it has been observed that adding all of the ester gum at one time makes the combination of ester gum and reclaim too liquid to permit re-incorporation of lumps of reclaim which may form, so that in order to increase the viscosity of the mass and keep it at the right consistency, the procedure is altered by adding clay and ester gum alternately. The oleic acid, or equivalent soap-forming acid, may be added at this point or at any previous point in the process.

After the above-mentioned ingredients have been added and a smooth consistency has been attained, sufficient water, and substantially only sufficient water as herein illustrated, (as described more in detail in connection with Example 1) is then added to render the batch invertible upon addition of alkali, and the batch is brought to the inversion temperature, preferably about 145° F. In commercial practice, with a batch having a total weight of about 2500 lbs., the circulation of cooling water is so adjusted as to attain the above temperature at about the time the water has all been worked into the mixture.

The potassium hydroxide is next added, preferably dissolved in two to three times its weight of water, whereupon inversion of phase begins. The mixing is now continued with a lowering of temperature until inversion of phase is substantially complete, the rubber and resin, together with filler, becoming the internal phase and the water solution of soap becoming the external phase of the dispersion or composition. The balance of the water is then incorporated and mixed until a smooth composition of desired fluidity or consistency is formed.

With the above described methods of incorporating the above ingredients into an adhesive composition, we have produced an emulsion in which the adhesive material remains in the dispersed phase in a stabilized state in containers during storage, and when applied in use, it dries to form a smooth homongenous normally tacky adhesive film which is tenacious and adhering.

As above pointed out, the water added prior to inversion must not much exceed that amount which is sufficient to permit inversion. Also, for any given batch, the inversion temperature is quite critical. Therefore, after the rubber, tack-producer, etc., are uniformly mixed and blended together, usually at a temperature above the inversion temperature, water is introduced, usually partly or largely in the form of ice, and the proportion of water and ice should be adjusted so as to control and accomplish just the desired temperature reduction without adding too much water and without exceeding the maximum optimum water content prior to inversion. If this feature of control is not adhered to, the batch of cement may be ruined: see the aforesaid copending application of Livermore, Lindner and myself, Serial No. 247,842. While the optimum proportion of water to solids introduced prior to inversion may vary considerably with differing mixtures or compositions, as above indicated, yet the water is commonly introduced only in a minor proportion by weight of the solids, seldom going above about 25 per cent or below about 10 percent in the production of aqueous adhesive rubber dispersions of quite widely varying characteristics known to me. However, for any predetermined batch and chosen inversion temperature within the inversion range, the proportion of water to solids must ordinarily be kept within a variation of plus or minus about 10 percent of the optimum proportion, and often this variation must be still more closely restricted; that is, if the optimum proportion of water to solids is 20 percent by weight, ordinarily it is important to make sure that the proportion of water to solids, by weight, is kept within the range of 18 to 22 percent, or even within the more restricted range of 19 to 21 percent. With inversion temperatures near the lower end of the permissible range, the proportion of water to solids may be somewhat higher, and, vice versa, with inversion temperatures near the higher end of the permissible range, the proportion of water to solids may be somewhat lower than otherwise.

It is generally (though not always) the case that where a filler such as a non-colloidal or low colloidal clay is absent, or is present in fixed ratio to rubber or reclaim, the higher the proportion of compatible resinous tack-producer to rubber, the lower will be the optimum proportion of water to total solids required for inversion.

Herein various illustrative details of operation and certain specific materials are set out to illustrate and not to limit my invention. For example, the oleic acid of the above examples may be present in different proportions, slightly higher where desirable to get increased stability, or it may be replaced by other soap-forming acids, or comparable reactants, which may be reacted, e. g., with KOH, etc., to produce a dispersing agent in situ at the point of inversion. Also while ester gum, e. g., of low acid number, and "Nevillite" resin are given as illustrations of tack-producers for rubber, having the combined virtues of being compatible with rubber in all proportions, being good tack-producers therefor, and being substantially unattacked by dilute aqueous alkaline solutions, it is to be understood that certain other resins or resinous materials may be employed so long as they are sufficiently compatible with the rubber and permit the final pH of the dispersion to be greater than 7, while still serving the function of increasing the tack or pressure-sensitivity of a dried film of such dispersion to an interesting or sufficient degree. However where a transparent or clear dried film is desired, as where a light-colored rubber, which is substantially transparent in the form of thin films or sheets, such as natural or synthetic rubber is employed, it is, of course, necessary to employ a tack producer which, like ester gum and/or "Nevillite" resin, will not discolor or opacify the dried film. As above pointed out, abietic acid (i. e., rosin) may be employed in the mixture and, as such, is capable of acting as a tack-producer for rubber, especially if used in sufficient amount so as not to be entirely converted into rosin soap by KOH or the like.

"Nevillite" resin is briefly described hereinabove and is a material well known to those skilled in the art. As stated, it may be made by hydrogenation, e. g. with Raney nickel catalyst, of constituents, such as polymers derived from indene, coumarone and/or cyclopentadiene. Descriptions of hydrogenation techniques will be found in the U. S. Patent to Carmody, No. 2,152,533, issued March 28, 1939, and in Industrial and Engineering Chemistry, vol. 32, pages 684–692 (May, 1940). The resin should preferably have a melting point of about 70° C. or higher, melting points of about 150° C. or even higher being readily attainable in this type of resin. The resin (sold by the Neville Co., Pittsburgh) need not be described further, since it is per se no part of the present invention, but it is to be observed that it distinguishes widely from coumarone resin or the like in its use in the present invention, among other things in respect to solubility or compatibility with rubber.

All embodiments within the scope of this specification and/or the appended claims are comprehended.

This application is a continuation of my copending application Serial No. 199,189, filed March 31, 1938. Reference is also made to the copending application of Harvey J. Livermore, Gordon F. Lindner and myself, Serial No. 247,842, filed December 27, 1938.

What I claim is:

1. In the making of a water dispersed adhesive which, upon drying, will yield a tacky pressure sensitive film, the steps which include dispersing water in limited proportions substantially uniformly throughout a smooth plastic tacky material, including reclaimed rubber, a compatible resinous tack-producer therefor and a soap-forming acid, to form a smooth viscous dispersion of the water-in-oil type, said water being introduced in sufficient amount to permit inversion of phase upon the subsequent addition of alkali; and thereafter, while controlling the batch at a superatmospheric temperature within a substantial but limited range lying above and below 145° F., adding alkali thereto to render said batch alkaline and to form soap dispersing agent, with continued kneading and mixing of the batch, whereupon inversion of phase takes place and an oil-in-water type dispersion is produced, the soap dispersing agent being formed in situ at the point of inversion.

2. In the making of a water dispersed adhesive which, upon drying, will yield a clear, transparent, tacky, pressure-sensitive film, the steps which include forming a smooth uniform light, clear-colored plastic tacky mix from clear-colored rubber, a compatible tack-producing resin and a soap-forming acid and then dispersing water in limited proportion substantially uniformly throughout said mix, by kneading and mixing, to form a uniform viscous dispersion of the water-in-oil type, said water being introduced in sufficient proportion to permit inversion of phase within a predetermined limited temperature range upon the subsequent addition of alkali; and then, while maintaining the batch within the aforesaid limited temperature range, adding alkali thereto in sufficient amount to render said batch alkaline, viz. of a pH above 7, and to form soap dispersing agent in situ, with continued kneading and mixing of the batch, whereupon inversion of phase takes place smoothly and an oil-in-water type dispersion of fine particle size and desired phase relation is produced, the soap dispersing agent being formed in situ at the point of inversion, said oil-in-water type dispersion, upon drying, yielding a pressure-sensitive film of unique adhesive qualities.

3. The method of making a water-dispersed rubber adhesive which includes combining a tacky rubber-containing material with a soap-forming acid by mixing at elevated temperatures of at least about 190° F., then adding water to the mix to the extent of 15–30 percent by weight of the rubber composition and mixing to form a uniform plastic dispersion of the water-in-oil type, and then, while maintaining the mix at a temperature of the general order of 145° F., adding alkali to the mix to render it alkaline and to form soap, whereupon, with continued kneading and mixing, inversion of phase of the dispersion takes place and soap is concurrently formed in situ.

4. The method of making a stable waterproof rubber adhesive which includes combining a tacky rubber material with a soap-forming acid by mixing at an elevated temperature of at least 190° F. and combining with such mix a minor proportion of water and/or ice, the water being supplied in sufficient amount so that it will be dispersed in the rubber mix to form a plastic rubber emulsion of the water-in-oil type which can be inverted in phase merely by the addition of alkali and continued mixing, and then, with the temperature of the mix reduced from the aforesaid elevated temperature to a temperature of the order of 145° F., adding alkali thereto, whereupon the dispersion is inverted, water becoming the continuous phase and rubber being dispersed therein, kneading and mixing of the said mix continuing during inversion.

5. A method of making a water-dispersed rubber-containing composition which comprises intimately intermixing a rubber material with a soap-forming acid by mixing at elevated temperatures of at least approximately 190° F., but below about 250° F.; combining with such mix a minor proportion of water in the substantial absence of alkali and soap, the amount of water introduced into the mix being sufficient, but not greatly in excess of that amount which is sufficient, to permit inversion of the dispersion upon the addition of alkali and continued mixing and kneading, and said amount of water being approximately within the range of fifteen to thirty percent by weight of the total water necessary to give a sprayable viscosity in the final oil-in-water type dispersion; and, subsequent to the addition of water and while maintaining the temperature of the mix at a superatmospheric temperature sufficiently low to avoid the production of a coarse finished emulsion, the last mentioned temperature being of the order of approximately 145° F., adding potassium hydroxide to the mix in amount sufficient so that the resulting pH of the mix is substantially in excess of seven, whereupon a smooth inversion of phase takes place, the aqueous liquid becoming the continuous phase and the rubber being dispersed therein, and a smooth, fine dispersion is attained;

and then diluting with the remaining 70–85 percent of the total water to give a final oil-in-water type dispersion of a sprayable viscosity.

6. The method of making an adhesive composition which comprises working together reclaim rubber and a compatible resin at a temperature above about 190° F. in an internal mixer to form a smooth mass, then simultaneously cooling said mixture and introducing a limited amount of water thereinto by introducing the same partly in the form of ice while continuing the mixing, and then when the amount of water introduced into the mass is sufficient, but not greatly in excess of that amount which is sufficient, to permit inversion of the emulsion in the presence of an intimately admixed soap dispersing agent and, while maintaining the temperature of the mass at about 140° to 160° F., introducing said dispersing agent thereinto in uniformly disseminated condition and in sufficient amount to effect inversion of the dispersion, whereupon water becomes the continuous phase and the mixture comprising rubber and resin is dispersed therein.

7. The method of making an adhesive composition which, upon drying, will yield a light colored, relatively clear, tacky, pressure-sensitive adhesive film, which comprises working together rubber, a tack-producing resin of low acid number which is compatible with said rubber and a soap-forming acid at a temperature above 190° F. in an internal mixer to form a smooth mass, then simultaneously cooling said mixture and introducing a limited amount of water thereinto by introducing the same partly in the form of ice while continuing the mixing, and then when the amount of water introduced into the mass is sufficient but not greatly in excess of that amount which is sufficient, to permit inversion of the emulsion upon the addition of alkali hydroxide and, while maintaining the temperature of the mass in the range of about 140° to 160° F., adding an alkali hydroxide thereto in sufficient amount to effect inversion of the dispersion, whereupon water becomes the continuous phase and the mixture comprising rubber and resin is dispersed therein.

8. The method of making an oil-in-water type adhesive dispersion which comprises producing a plastic tacky material including rubber by kneading and agitation at a temperature of at least approximately 190° F.; incorporating water in said plastic tacky material by mixing and mastication to form a uniform dispersion of the water-in-oil type while gradually reducing the temperature of the mass, said water being incorporated in sufficient amount but not greatly in excess of that amount which is sufficient to permit subsequent inversion of phase solely upon bringing a dispersing agent into uniformly disseminated contact with said water-in-oil dispersion; and then, while maintaining said water-in-oil dispersion within a restricted temperature range approximating 145° F., bringing a dispersing agent into uniformly disseminated contact therewith, so that inversion of phase takes place forthwith.

9. The method of making an oil-in-water type adhesive dispersion which comprises kneading and agitating a plastic tacky water-insoluble organic material to form a smooth, uniform viscous, plastic, ductile, tacky mass; incorporating water in such mass by mixing and mastication to form a uniform dispersion of the water-in-oil type, said water being incorporated in sufficient amount but not greatly in excess of that amount which is sufficient to permit subsequent inversion of phase solely upon bringing a dispersing agent into uniformly disseminated contact with said water-in-oil dispersion; and then, while maintaining said water-in-oil dispersion within a restricted temperature range, bringing a dispersing agent into uniformly disseminated contact therewith, so that inversion of phase takes place forthwith.

10. The method of making an oil-in-water type dispersion which comprises blending together rubber and a tack producing agent which is compatible with said rubber, at a temperature of at least about 190° F. to form a uniform plastic, tacky, ductile mass; incorporating water in such mass by mixing and mastication to form a uniform dispersion of the water-in-oil type, while gradually reducing the temperature of said mass, said water being incorporated in sufficient amount but not greatly in excess of that amount which is sufficient to permit subsequent inversion of phase solely upon bringing a dispersing agent into uniformly disseminated contact with said water-in-oil dispersion; and then, while maintaining said water-in-oil dispersion within a restricted temperature range approximating 145° F., bringing a dispersing agent into uniformly disseminated contact therewith, so that inversion of phase takes place forthwith.

11. The method of making an oil-in-water type dispersion which, upon drying, will yield a light colored, relatively clear, tacky, pressure-sensitive film, which comprises blending together rubber and a resinous material including ester gum at a temperature above about 190° F. to form a uniform plastic mass; incorporating water in such mass by mixing and mastication to form a uniform dispersion of the water-in-oil type, while gradually reducing the temperature of said mass, said water being incorporated in sufficient amount but not greatly in excess of that amount which is sufficient to permit subsequent inversion of phase solely upon bringing a dispersing agent into uniformly disseminated contact with said water-in-oil dispersion; and then, while maintaining said water-in-oil dispersion within a restricted temperature range approximating 145° F., bringing a dispersing agent into uniformly disseminated contact therewith, so that inversion of phase takes place forthwith.

12. The method of making an adhesive composition which, upon drying in film form, will yield a light colored, relatively clear, transparent, tacky, pressure-sensitive adhesive film, which comprises blending together rubber and a compatible tack-producing agent comprising a hydrocarbon resin substantially of the nature of a "Nevillite" resin as herein defined, at a temperature above about 190° F. to form a uniform mass; incorporating water in such mass by mixing and mastication to form a uniform dispersion of the water-in-oil type, while gradually reducing the temperature of said mass, said water being incorporated in sufficient amount but not greatly in excess of that amount which is sufficient to permit subsequent inversion of phase solely upon bringing a dispersing agent into uniformly disseminated contact with said water-in-oil dispersion; and then, while maintaining said water-in-oil dispersion within a restricted temperature range approximating 145° F., bringing a dispersing agent into uniformly disseminated contact therewith, so that inversion of phase takes place forthwith.

13. The method of making an adhesive dispersion of the oil-in-water type which comprises blending together organic ingredients consisting substantially exclusively of rubber, ester gum of low acid number, sufficient in amount to render said rubber tacky but in lesser amount by weight than said rubber, and a soap forming acid by mechanical working at a temperature of approximately 190° to 210° F. to form a smooth mass, then simultaneously cooling the resulting blend of materials and introducing a limited amount of water thereinto by introducing the same partly in the form of ice while continuing the mixing, and then when the amount of water introduced into the mass is sufficient, but not greatly in excess of that amount which is sufficient, to permit inversion of the dispersion upon addition of alkali hydroxide and, while maintaining the temperature of the mass at approximately 145° F., adding an alkali hydroxide thereto in a sufficient amount to effect inversion of the dispersion, whereupon water becomes the continuous phase and the mixture comprising the blend of rubber and ester gum is dispersed therein.

14. The method of making an adhesive dispersion of the oil-in-water type which comprises blending together organic ingredients consisting substantially exclusively of rubber, a substantially non-acidic tack-producing resin compatible with said rubber and consisting of a "Nevillite" resin as herein described, sufficient in amount to render said rubber tacky but in lesser amount by weight than said rubber, and a soap forming acid by mechanical working at a temperature of approximately 190° to 210° F. to form a smooth mass, then simultaneously cooling the resulting blend of materials and introducing a limited amount of water thereinto by introducing the same partly in the form of ice while continuing the mixing, and then when the amount of water introduced into the mass is sufficient, but not greatly in excess of that amount which is sufficient, to permit inversion of the dispersion upon addition of alkali hydroxide and, while maintaining the temperature of the mass at approximately 145° F., adding an alkali hydroxide thereto in a sufficient amount to effect inversion of the dispersion, whereupon water becomes the continuous phase and the mixture comprising the blend of rubber and resin is dispersed therein, said "Nevillite" resin being substantially completely free of acids, having a melting point of at least about 70° C. (158° F.) and being compatible with said rubber in all proportions.

HENRY N. STEPHENS.